(12) United States Patent
Morton

(10) Patent No.: US 7,146,922 B1
(45) Date of Patent: Dec. 12, 2006

(54) TOWLINE FUSE AND STRAIN ENERGY DISSIPATION DEVICE

(75) Inventor: Scott A. Morton, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 11/153,581

(22) Filed: Jun. 15, 2005

Related U.S. Application Data

(60) Provisional application No. 60/582,315, filed on Jun. 23, 2004.

(51) Int. Cl.
*B63B 21/04* (2006.01)
(52) U.S. Cl. .............................. 114/253; 403/2; 403/41
(58) Field of Classification Search ................ 114/215, 114/216, 242, 248, 249, 253; 174/84 R, 174/86; 285/2; 367/177; 403/2, 41, 78, 403/79
See application file for complete search history.

(56) References Cited

U.S. PATENT DOCUMENTS 4,330,926 A * 5/1982 McCall ........................ 403/2
4,467,598 A    8/1984 Wells
5,466,082 A * 11/1995 Sherar ......................... 403/2
6,007,267 A * 12/1999 VanHorn ..................... 403/2

FOREIGN PATENT DOCUMENTS

EP    0 778 165 B1    10/1996

* cited by examiner

Primary Examiner—Lars A. Olson
(74) Attorney, Agent, or Firm—Emery L. Tracy

(57) ABSTRACT

A towline fuse device for use in a towing system with a towing vehicle and a towline is provided. The towline fuse device comprises a fuse mechanism for failing at a predetermined level of tensile force, the fuse mechanism mounted between the towing vehicle and the towline wherein the predetermined level of failure of the fuse mechanism is less than the towing ratings of the towing system. The strain energy in the towline is then harmlessly dissipated in the towline fuse device.

23 Claims, 6 Drawing Sheets

Towline fuse embodying frictional dissipation of towline strain energy.

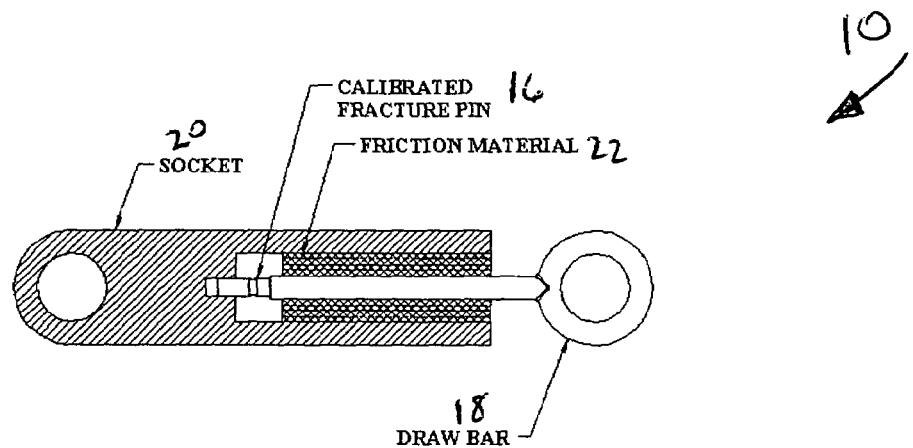
Figure 1 Towline fuse embodying frictional dissipation of towline strain energy.
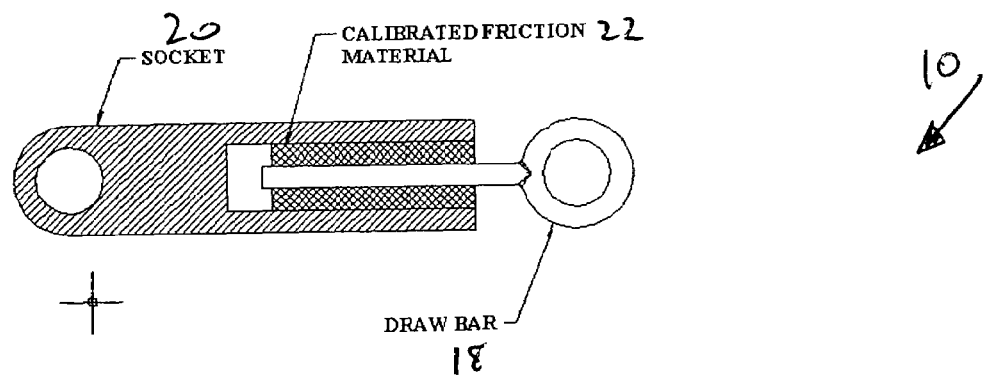
Figure 2 Towline fuse embodying controlled frictional release and frictional dissipation of towline strain energy.

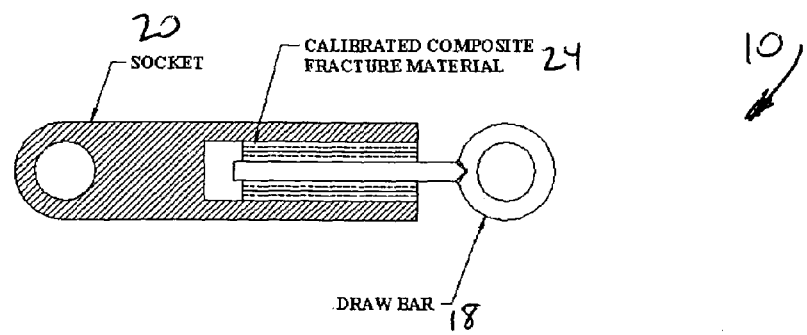
Figure 3 Towline fuse embodying controlled fracture of composite material to dissipate towline strain energy.
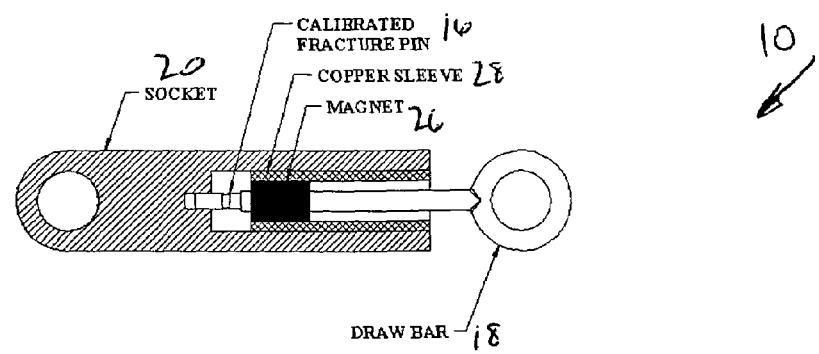
Figure 4 Towline fuse embodying controlled fracture of composite material to dissipate towline strain energy.

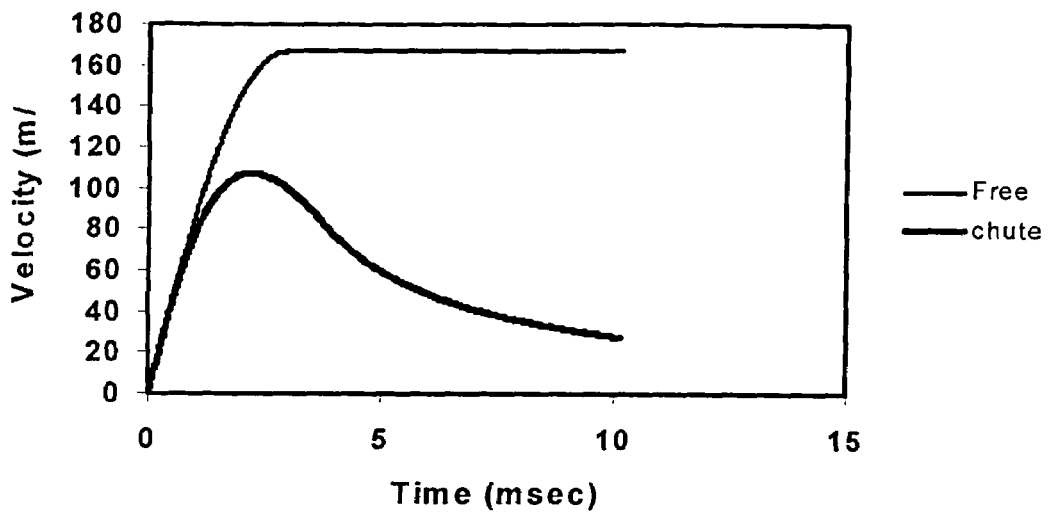
Fig. 5  Hook velocity of a 0.25 kilogram hook as a function of time from the release event with and without aerodynamic dissipation (drag chute) of strain energy from a 15-foot long tow strap
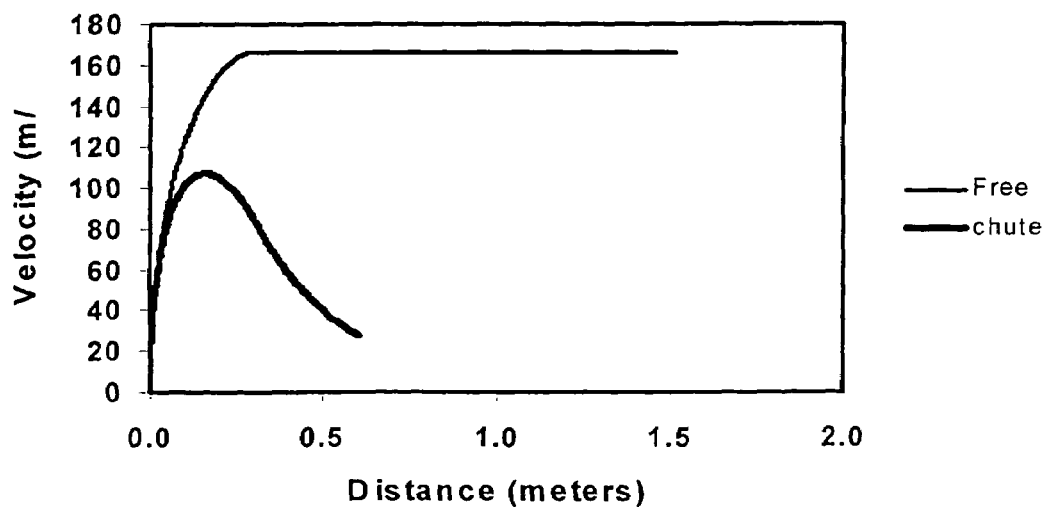
Fig. 6  Hook velocity of a 0.25 kilogram hook as a function of distance from the release point with and without aerodynamic dissipation (drag chute) of strain energy from a 15-foot long tow strap

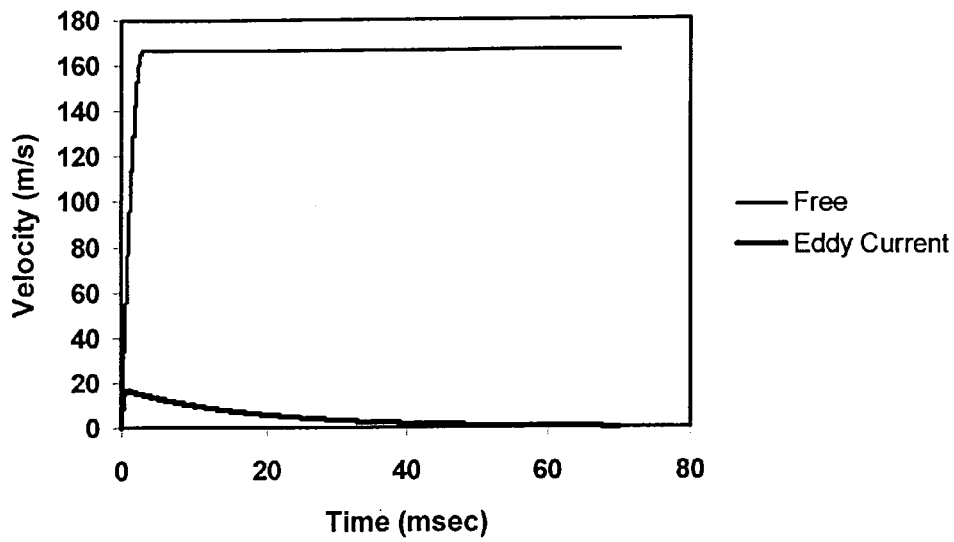
Fig. 7  Hook velocity of a 0.25 kilogram hook as a function of time from the release event with and without Eddy current dissipation of strain energy from a 15-foot long tow strap
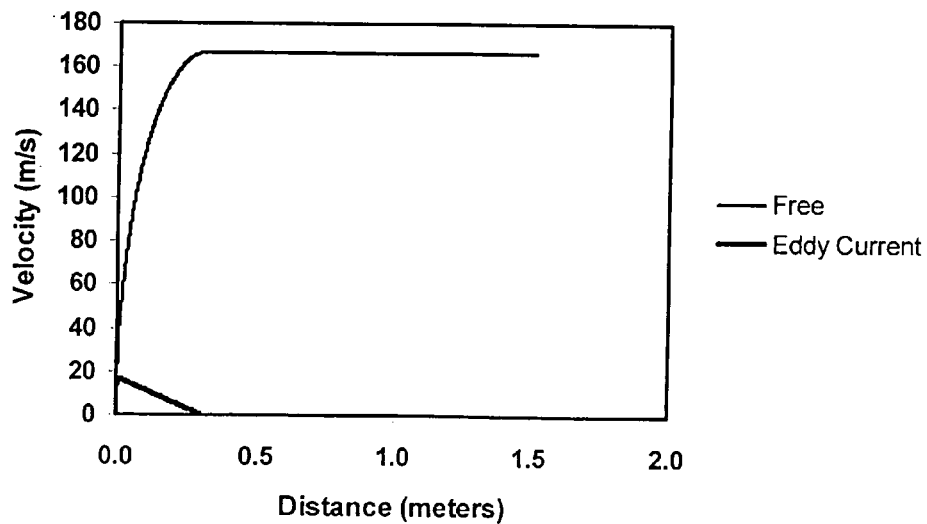
Fig. 8  Hook velocity of a 0.25 kilogram hook as a function of distance from the release point with and without Eddy current dissipation of strain energy from a 15-foot long tow strap

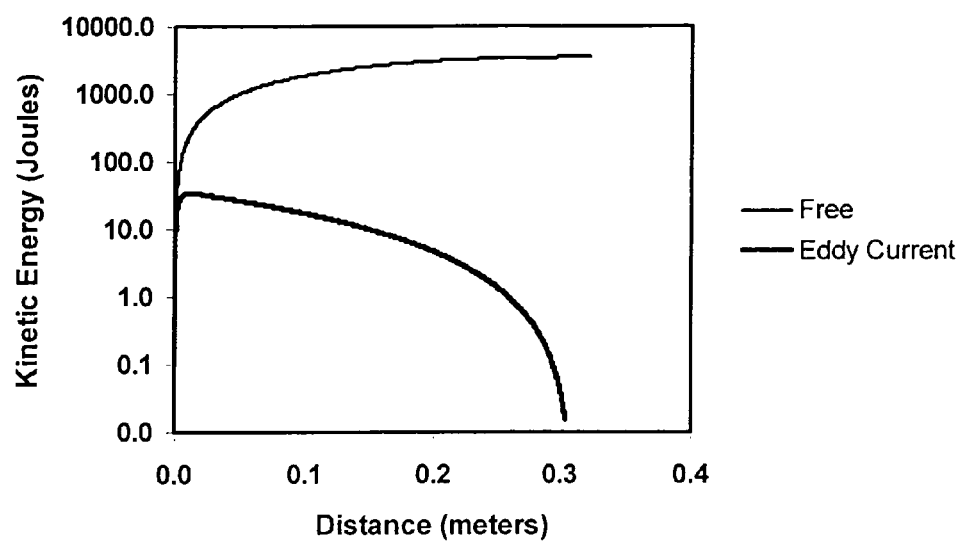
Fig. 9 Kinetic energy of a 0.25 kilogram hook as a function of distance from the release point with and without Eddy current dissipation of strain energy for a 15-foot long tow strap

TOWLINE FUSE AND STRAIN ENERGY DISSIPATION DEVICE

The present application is a continuation-in-part of pending provisional patent application Ser. No. 60/582,315, filed on Jun. 23, 2004, entitled "Towing Fuse for Cable/Rope/Chain Towing Devices".

BACKGROUND OF THE INVENTION

1. Field of the Invention

This invention relates generally to a towing system for towing equipment with a cable, rope, or chain towing device and, more particularly, the invention relates to towline fuse and strain energy dissipation device included in the towing system that fails at a predetermined level of tensile force that is lower than the towing ratings of the rest of the towing system components, thereby acting as a "fuse" for the towing system and harmlessly dissipates the strain energy stored in the stretched towline.

2. Description of the Prior Art

When using a cable, rope, or chain, hereafter referred to as the towline, to tow a load with a mobile vehicle, the line or the towing attachments can be easily overloaded, causing failure of some portion of the towing system. When the towline separates, strain energy stored in the line can cause the parts of the system to fly off in unpredictable directions, endangering life, and/or property. Such failures have been known to cause injury and death.

SUMMARY

The present invention is a towline fuse device for use in a towing system with a towing vehicle and a towline. The towline fuse device comprises fuse means for failing at a predetermined level of tensile force, the fuse means mounted between the towing vehicle and the towline, wherein the predetermined level of failure of the fuse means is less than the towing ratings of the towing system. In addition, the towline fuse device comprises means for dissipating strain energy stored in the elastically stretched towline through friction, eddy currents, aerodynamic or hydrodynamic turbulence, or other dissipative means.

The present invention further includes a method for towing with a towline and a towing vehicle. The method comprises mounting a fuse device between the towing vehicle and the towline, failing the fuse device at a predetermined level of tensile force, and dissipating towline strain energy immediately after the failure of the fuse device, the fuse device failing at a predetermined level of tensile force wherein the predetermined level of failure of the fuse device is less than the towing ratings of the towing system and the strain energy stored in the stretched towline is harmlessly dissipated.

Furthermore, the present invention includes a towline device for use in a towing system with a towing vehicle and a towline. The towline device comprises towline strain energy dispersion means for dissipating towline strain energy of the towline upon failure of the towline.

BRIEF DESCRIPTION OF THE DRAWINGS

FIG. 1 is a sectional view illustrating a towline fuse device embodying calibrated fracture of a tension member and frictional dissipation of towline strain energy, constructed in accordance with the present invention;

FIG. 2 is a sectional view illustrating a towline fuse device embodying controlled frictional release to initiate separation of the towing fuse and frictional dissipation of towline strain energy, constructed in accordance with the present invention;

FIG. 3 is a sectional view illustrating a towline fuse device embodying controlled fracture of composite material to initiate separation of the towing fuse and continued progressive fracture of the composite material to dissipate towline strain energy, constructed in accordance with the present invention;

FIG. 4 is a sectional view illustrating a towline fuse device embodying calibrated fracture of a tension member and eddy current heating to dissipate towline strain energy, constructed in accordance with the present invention;

FIG. 5 is a graph illustrating the hook velocity of a 0.25 kilogram hook as a function of time from the release event with and without aerodynamic dissipation (drag chute) of strain energy from a 15-foot long tow strap;

FIG. 6 is a graph illustrating the hook velocity of a 0.25 kilogram hook as a function of distance from the release point with and without aerodynamic dissipation (drag chute) of strain energy from a 15-foot long tow strap;

FIG. 7 is a graph illustrating the hook velocity of a 0.25 kilogram hook as a function of time from the release event with and without eddy current dissipation of strain energy from a 15-foot long tow strap;

FIG. 8 is a graph illustrating the hook velocity of a 0.25 kilogram hook as a function of distance from the release point with and without eddy current dissipation of strain energy from a 15-foot long tow strap;

FIG. 9 is a graph illustrating the kinetic energy of a 0.25 kilogram hook as a function of distance from the release point with and without eddy current dissipation of strain energy for a 15-foot long tow strap.

DETAILED DESCRIPTION OF THE PREFERRED EMBODIMENTS

Figure 10:
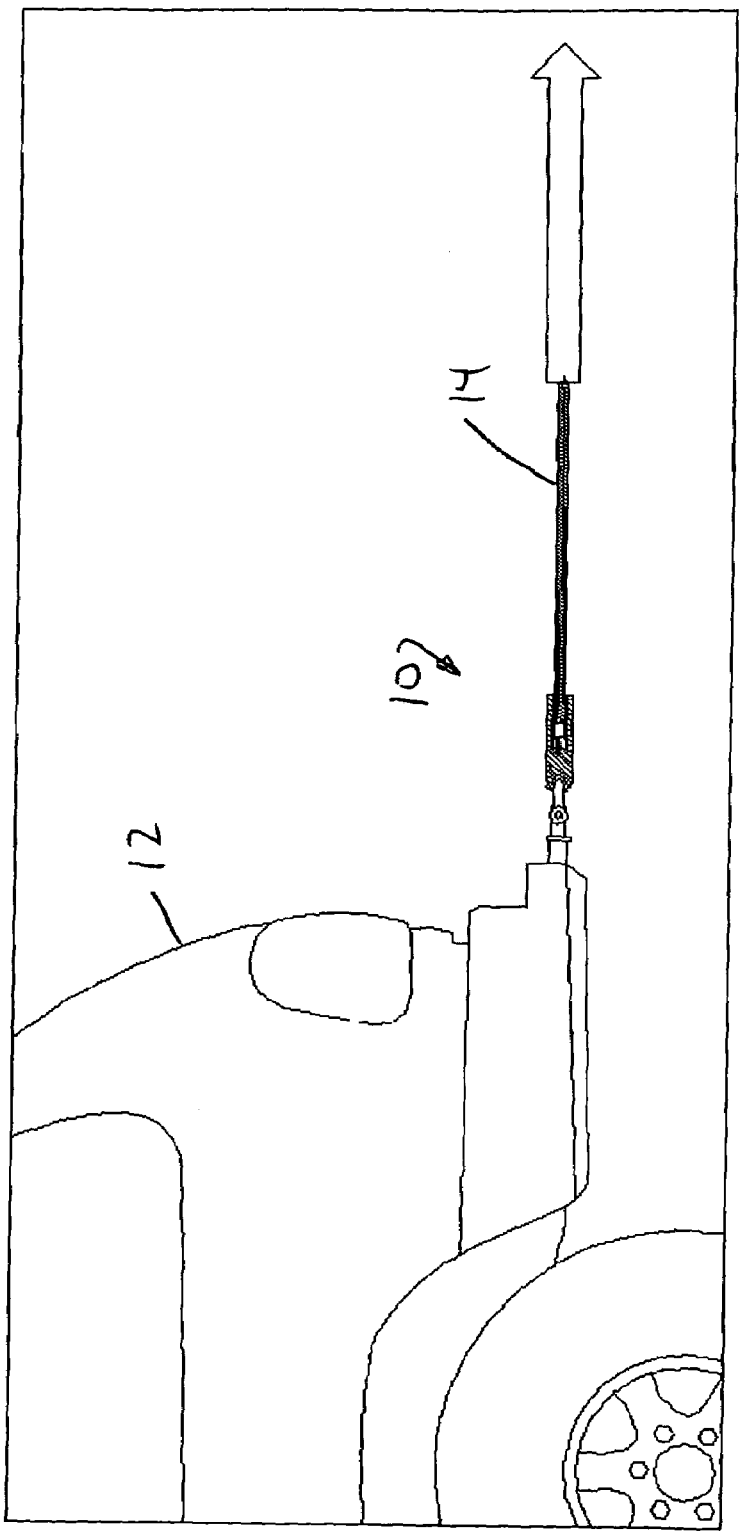
FIG. 10 is an elevational side view illustrating the towline fuse device, constructed in accordance with the present invention, secured between a vehicle and towable equipment.

As illustrated in FIGS. 1–4 and 10, the present invention is a towline fuse device, indicated generally at 10, positioned between towing equipment 12, i.e., a vehicle, and a cable, rope, or chain 14 for use in a towing system. In particular, the towline fuse device 10 of the present invention is a "link" included in the towing system that fails at a predetermined level of tensile force that is lower than the towing ratings of the rest of the towing system components, thereby acting as a "fuse" for the towing system. The towline fuse device 10 is designed in such a manner that the towline fuse device 10 absorbs any strain energy during the failure process, preventing towing system components from becoming deadly missiles which can injury any persons nearby. FIG. 10 illustrates the towline fuse device 10 as part of a towing system.

The means for dissipating the strain energy with the towline fuse device 10 of the present invention can take a number of forms, including, but not limited to:

Mechanical friction as the components of the towline fuse device 10 separate;

A given negative slope to the stress strain curve following failure of the towline fuse device 10. This would most likely require composite material construction of the towline fuse device 10, as described in further detail below;

Eddy current dissipation of strain energy from magnetic induction;

Aerodynamic dissipation of strain energy through turbulent mixing;

Hydraulic dissipation of the strain energy following failure of the towline fuse device 10; and Tethering of the towline fuse device 10 to prevent parts from becoming missiles. This is the least preferred embodiment, since the tether can also store significant strain energy and may break.

An embodiment of the towline fuse device 10 of the present invention is illustrated in FIG. 1. FIG. 1 illustrates a towline fuse device 10 embodying frictional dissipation of towline strain energy. The towline fuse device 10 includes a calibrated fracture pin 16 designed to fail at a predetermined tensile load, whereupon a drawbar 18 being pulled from a socket 20, the towline strain energy dissipates as heat through the interaction of the drawbar 18 with friction material 22. The friction material can be solid or reinforced rubber material or metallic, ceramic, or synthetic fibers such as Kevlar™ embedded in a resin matrix. This type of towline fuse device 10 is reusable by simply replacing the fracture pin 16 after use. The fracture pin 16 could be held in place by screw threads, retaining rings, or pins, or the like.

A shear pin is a second method (not shown) of obtaining a specific release loading and could readily replace the fracture pin 16. A third method of obtaining a specific release loading is to utilize a spring loaded latch mechanism (not shown). A spring loaded latch mechanism would allow adjustment of the release loading.

The strain energy dissipation could also be adjustable by including an adjustable spring loading mechanism for the friction material (not shown). Eye attachments are shown for the towline fuse device 10, but any standard towline attachment means, such as hooks, clevises, swaged fittings, or the like, could be used to incorporate the towline fuse device 10 into the towline 14. The other components would necessarily need to have higher load ratings than the towline fuse device 10 for the towline fuse device 10 to operate correctly. These attachment considerations apply to all embodiments of the towline fuse devices 10, as described herein.

The friction fuse embodiments of the towline fuse device 10 do not necessarily need to have a calibrated fracture pin 16 or a shear pin. Since the coefficient of static friction is greater than the coefficient of dynamic friction, a towline fuse device 10 can be designed to release at a particular static friction loading. The draw bar 18 will then slide from the socket 20, dissipating strain energy in the same manner as the friction towline fuse device 10 discussed above. This type of towline fuse device 10 could also be made adjustable and reusable.

FIG. 2 illustrates the construction of an embodiment of the present invention, a friction towline fuse device 10 without a calibrated fracture pin 16 in accordance with the present invention. FIG. 2 illustrates a towline fuse device 10 embodying controlled frictional release and frictional dissipation of towline strain energy. This method of load control would be less precise than a fracture method, but would be simpler and less expensive.

As illustrated in FIG. 3, in still another embodiment of the present invention, the towline fuse device 10 has a controlled failure strain curve towline fuse. FIG. 3 illustrates a towline fuse device 10 embodying controlled fracture of composite material to dissipate towline strain energy. The composite material sleeve 24 connecting the socket 20 with the draw bar 16 would be engineered to fail in a progressive, controlled manner. This is accomplished by selecting various ply materials and matrix materials, and then manipulating ply orientation and fiber volume to achieve progressive, controlled failure.

Composite material fuse elements 24 would be non-adjustable and non-reusable. The towline fuse device 10 could be designed to accept a replaceable composite material cartridge, similar to replacing an electrical fuse.

As illustrated in FIG. 4, in yet another embodiment of the present invention, the towline fuse device 10 dissipates the strain energy through eddy currents. FIG. 4 illustrates a towline fuse device 10 that includes a calibrated fracture pin 16 designed to fail at a predetermined tensile load, and the towline strain energy is dissipated through eddy current heating. The draw bar 18 would be attached to the socket 20 with a fracture pin 16, shear pin, or spring loaded latch, similar to the friction embodiment shown in FIG. 1. When the draw bar 18 releases, a permanent magnet 26 is drawn through a copper sleeve 28 and the eddy currents produced by the moving magnetic fields dissipate the strain energy as heat in the copper sleeve 28. This embodiment could be adjusted by changing the magnet to one with high or lower magnet energy product to achieve higher or lower energy dissipation, respectively, and could be reusable with the replacement of the fractured element or in the case of the spring loaded latch, by replacing the draw bar 18.

Hydraulic means of dissipating the strain energy are within the scope of the present invention. In general, these will be more complex and more expensive to implement. Hydraulic means would, however, allow precise control of the dissipation of strain energy throughout the release cycle. One means of doing this would be to have a variable area groove in a hydraulic cylinder wall, so that the resistance of the fluid bypassing the piston would decrease to match the decrease in the strain energy as the draw bar was withdrawn. A greater level of engineering design would be required to make such a device.

Aerodynamic means of dissipating the strain energy are also within the scope of the present invention. In such an embodiment, a small drag chute would be attached to the towline and packed into a receiving socket. Upon failure or release of a calibrated tensile fracture pin, a shear pin, or a spring loaded latch, the drag chute would be pulled from the socket by the towline and deployed by aerodynamic forces. However, aerodynamic forces vary as the square of the relative velocity between the drag chute and the surrounding atmosphere and vary with the density of the atmosphere, so the performance of such an embodiment would vary with such factors as the ambient temperature, the elevation, and the strength and direction of the local wind. Significant velocity of the released portion of the towline would have to be achieved for aerodynamic dissipation of strain energy to be operable.

The inventor of the present application has completed theoretical modeling of energy dissipation from a stretched, elastic tow rope, or strap using two different techniques, aerodynamic friction, and eddy current friction. Some assumptions were made to assure a conservative analysis:

the tow rope or strap has no mass,
the tow rope or strap has no internal damping,
the tow rope or strap is modeled as a linear spring with a spring constant of 15725 N/m/m,
the tow rope or strap is 15 feet (4.6 meters) long,
a hook of mass 0.25 kilograms is accelerated by the strain in the tow rope or strap, without any dissipation mechanisms, the strain energy is entirely converted into kinetic energy of the hook, and the towing fuse is located near the towing vehicle, but the acceleration of the vehicle away from the towed vehicle upon the activation of the towing fuse is negligible.

Using these assumptions, the velocity of the hook as a function of time and as a function of distance of the hook from the release point was calculated using a time step of 1μ second. The velocity as a function of time and distance for aerodynamic dissipation, i.e. a drag chute, are shown in FIGS. 5 and 6, respectively.

The velocity as a function of time and distance for eddy current dissipation, using a magnet of 1-inch diameter and 2-inches length, are shown in FIGS. 7 and 8, respectively.

The magnet parameters used in the analysis were:
1-inch diameter,
2-inches length,
Neodymium-Iron-Boron (NeFeB) magnet,
A magnet energy product of 17.5 MGOe, and
0.03125-inch air gap.

The initial assumptions for this analysis yielded hook velocities in the absence of dissipative methods that are significantly higher than actual velocities would be, since all sources of parasitic losses are ignored. Therefore, the dissipative mechanisms in this analysis should be able to perform at least as well as predicted. The eddy current dissipation looks particularly promising in keeping the kinetic energy of the hook low. FIG. 9 illustrates kinetic energy of the hook as a function of distance from the release point for eddy current dissipation. The maximum hook kinetic energy in this case is only $\frac{1}{100}$ that of the freely accelerated hook. Other dissipative mechanisms, such as air friction, ground friction, and internal fiber friction in the rope or strap, should then bring the hook to a halt not far from the release point. The main drawback of the eddy current dissipation device is that it would have to be about as long as or longer than the stretch in the tow rope or strap. In the example calculations the stretch is about $\frac{1}{3}$ of a meter or about 1 foot.

Aerodynamic dissipation is also possible, but the physical parameters are not as favorable. The results of the calculations that are shown in FIGS. 1 and 2 are for a drag chute 1 meter in diameter. Larger drag chutes will, of course, provide better performance, but even a 1-meter diameter chute is probably unreasonably large for a 4.6 meter long tow strap.

This analysis clearly shows that dissipation of the strain energy in a stretched tow rope or strap is possible using different mechanisms. The eddy current dissipation mechanism could be built into a practical device, essentially a tube one and one-half (1½") inches in diameter and about one (1') foot long. The tube would consist of an iron exterior tube lined with a copper tube about $\frac{1}{32}$ inch thick.

The potential market for the present invention include:
Automotive towing, potentially applicable to those individuals who carry towing equipment in their personal vehicles
Industrial towing applications. This idea specifically stems from the problem of towing large equipment in a surface coal mine where safety considerations are stringent and the forces and strain energies involved are extremely large.
Winch operation, both automotive and industrial. The automotive market may be better than the industrial market, since torque limiting equipment can be incorporated in larger, expensive winches.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A towline fuse device for use in a towing system with a towing vehicle and a towline, the towline fuse device comprising:
   fuse means for failing at a predetermined level of tensile force, the fuse means mounted between the towing vehicle and the towline; and
   towline strain energy dispersion means for dissipating towline strain energy immediately after the failure of the fuse means;
   wherein the predetermined level of failure of the fuse means is less than the towing ratings of the towing system; and
   wherein the fuse means is a calibrated composite material for dissipating towline strain energy, the composite material failing in a progressive controlled manner.

2. The towline fuse device of claim 1 wherein the fuse means comprises:
   a drawbar securable to the towline;
   a socket securable to the towing vehicle, the socket having an opening, at least a portion of the drawbar receivable within the opening of the socket; and
   wherein the calibrated composite material surrounds at least a portion of the drawbar within the opening of the socket;
   whereupon the drawbar sliding from the socket, towline strain energy dissipates as heat through the interaction of the drawbar with the calibrated composite material.

3. The towline fuse device of claim 2 and further comprising:
   a fracture pin within the opening and mounted between the drawbar and the socket, the fracture pin failable at a predetermined tensile load.

4. The towline fuse device of claim 3 wherein the fracture pin is replaceable within the opening of the socket after use.

5. The towline fuse device of claim 3 wherein the fracture pin is secured within the opening by a fastening mechanism selected from the group consisting of screw threads, retaining rings, and pins.

6. The towline fuse device of claim 2 and further comprising:
   a shear pin within the opening and mounted between the drawbar and the socket, the shear pin failable at a predetermined tensile load.

7. The towline fuse device of claim 2 and further comprising:
   a spring loaded latch mechanism within the opening and mounted between the drawbar and the socket, the spring loaded latch mechanism failable at a predetermined tensile load and allowing adjustment of the release loading.

8. The towline fuse device of claim 2 wherein the draw bar has an attachment device selected from the group consisting of eye hooks, hooks, clevises, and swaged fittings.

9. The towline fuse device of claim 2 wherein the composite material connects the socket with the draw bar.

10. The towline fuse device of claim 1 wherein the composite material is selected from ply materials and matrix materials, the ply orientation and fiber volume being manipulated to achieve progressive, controlled failure.

11. The towline fuse device of claim 1 wherein the composite material is a replaceable composite material cartridge.

12. A method for towing with a towline and a towing vehicle, the method comprising:
mounting a fuse device between the towing vehicle and the towline;
failing the fuse device at a predetermined level of tensile force; and
dissipating towline strain energy immediately after the failure of the fuse device through a calibrated composite material fracture;
wherein the predetermined level of failure of the fuse device is less than the towing ratings of the towing system.

13. The method of claim 12 and further comprising:
securing a drawbar to the towline;
securing a socket to the towing vehicle, the socket having an opening;
inserting at least a portion of the drawbar into the opening of the socket;
surrounding at least a portion of the drawbar within the opening of the socket with the calibrated composite material;
sliding the drawbar from the socket; and
dissipating any towline strain energy as heat through the interaction of the drawbar with the calibrated composite friction material.

14. The method of claim 13 and further comprising:
mounting a fracture pin within the opening and between the drawbar and the socket, the fracture pin failable at a predetermined tensile load.

15. The method of claim 13 and further comprising:
mounting a shear pin within the opening and between the drawbar and the socket, the shear pin failable at a predetermined tensile load.

16. The method of claim 13 and further comprising:
mounting a spring loaded latch mechanism within the opening and between the drawbar and the socket, the spring loaded latch mechanism failable at a predetermined tensile load; and
adjusting the release loading of the spring loaded latch mechanism.

17. A towline fuse device for use in a towing system with a towing vehicle and a towline, the towline fuse device comprising:
fuse means for failing at a predetermined level of tensile force, the fuse means mounted between the towing vehicle and the towline and having a drawbar securable to the towline, a socket securable to the towing vehicle, the socket having an opening, at least a portion of the drawbar receivable within the opening of the socket, and friction material surrounding at least a portion of the drawbar within the opening of the socket;
a spring loaded latch mechanism within the opening and mounted between the drawbar and the socket, the spring loaded latch mechanism failable at a predetermined tensile load and allowing adjustment of the release loading; and
towline strain energy dispersion means for dissipating towline strain energy immediately after the failure of the fuse means whereupon the drawbar sliding from the socket, towline strain energy dissipates as heat through the interaction of the drawbar with the friction material;
wherein the predetermined level of failure of the fuse means is less than the towing ratings of the towing system.

18. A towline fuse device for use in a towing system with a towing vehicle and a towline, the towline fuse device comprising:
fuse means for failing at a predetermined level of tensile force, the fuse means mounted between the towing vehicle and the towline; and
towline strain energy dispersion means for dissipating towline strain energy immediately after the failure of the fuse means, the towline strain energy dispersion means selected from the group consisting of eddy currents, hydraulic turbulence, and aerodynamic drag;
wherein the predetermined level of failure of the fuse means is less than the towing ratings of the towing system.

19. The towline fuse device of claim 18 and further comprising:
a drawbar securable to the towline;
a socket securable to the towing vehicle, the socket having an opening, at least a portion of the drawbar receivable within the opening of the socket;
a fracture pin within the opening and mounted between the drawbar and the socket, the fracture pin failable at a predetermined tensile load; and
a copper sleeve mounted to the drawbar;
a magnet mounted about the drawbar within the copper sleeve;
whereupon the drawbar sliding from the socket, the magnet is drawn through the copper sleeve thereby producing eddy currents by the moving magnetic fields and dissipating the strain energy as heat in the copper sleeve.

20. The towline fuse device of claim 18 wherein the hydraulic turbulence is hydraulic fluid forced through an orifice or restriction.

21. The towline fuse device of claim 18 wherein the aerodynamic drag is a drag chute.

22. A method for towing with a towline and a towing vehicle, the method comprising:
securing a drawbar to the towline;
securing a socket to the towing vehicle, the socket having an opening;
inserting at least a portion of the drawbar into the opening of the socket;
surrounding at least a portion of the drawbar within the opening of the socket with a friction material;
sliding the drawbar from the socket;
mounting a spring loaded latch mechanism within the opening and between the drawbar and the socket, the spring loaded latch mechanism failable at a predetermined tensile load;
adjusting the release loading of the spring loaded latch mechanism; failing the friction material at a predetermined level of tensile force; and
dissipating any towline strain energy as heat through the interaction of the drawbar with the friction material;

wherein the predetermined level of failure of the friction material is less than the towing ratings of the towing system.

23. A method for towing with a towline and a towing vehicle, the method comprising:
mounting a fuse device between the towing vehicle and the towline;
failing the fuse device at a predetermined level of tensile force; and
dissipating towline strain energy immediately after the failure of the fuse device through the group consisting of eddy currents, hydraulic turbulence, and aerodynamic drag;
wherein the predetermined level of failure of the fuse device is less than the towing ratings of the towing system.

* * * * *